US012562839B2

(12) United States Patent
Hu et al.

(10) Patent No.: US 12,562,839 B2
(45) Date of Patent: Feb. 24, 2026

(54) DETAILED SIGNALING DESIGNS FOR DISTRIBUTED-TONE RESOURCE UNIT TRANSMISSION

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 218 days.

(21) Appl. No.: 18/072,672

(22) Filed: Nov. 30, 2022

(65) Prior Publication Data

US 2023/0179332 A1     Jun. 8, 2023

Related U.S. Application Data

(60) Provisional application No. 63/286,122, filed on Dec. 6, 2021.

(51) Int. Cl.
H04L 1/00 (2006.01)
H04L 1/06 (2006.01)

(52) U.S. Cl.
CPC .......... H04L 1/0084 (2013.01); H04L 1/0606 (2013.01)

(58) Field of Classification Search
CPC ..... H04W 72/23; H04W 52/54; H04W 52/30; H04W 72/04; H04L 5/0094; H04L 5/0053; H04L 5/0044; H04L 5/0048; H04L 1/0084; H04L 1/0606; H04L 5/0023
See application file for complete search history.

(56) References Cited

U.S. PATENT DOCUMENTS

| | | | |
|---|---|---|---|
| 2018/0255589 A1 | 9/2018 | Patil et al. | |
| 2019/0260531 A1 | 8/2019 | Chen et al. | |
| 2020/0008185 A1 | 1/2020 | Chen et al. | |
| 2021/0288769 A1 | 9/2021 | Yang et al. | |

(Continued)

FOREIGN PATENT DOCUMENTS

| | | |
|---|---|---|
| CN | 107534502 A | 1/2018 |
| CN | 112703763 A | 4/2021 |

(Continued)

OTHER PUBLICATIONS

Taiwan Intellectual Property Office, Office Action in Taiwan Patent Application No. 111146536, Apr. 17, 2023.

(Continued)

*Primary Examiner* — Jung Liu

(74) *Attorney, Agent, or Firm* — Andy M. Han; Han IP PLLC

(57)     ABSTRACT

Techniques pertaining to detailed signaling designs for distributed-tone resource unit (dRU) transmission in wireless communications are described. An apparatus generates a frame with indications of a resource unit (RU) type and a dRU distribution bandwidth. The apparatus then transmits the frame to another apparatus. The RU type is indicated in a Common Information field or a Special User Information field of the frame. The dRU distribution bandwidth is indicated in a Spatial Stream (SS) Allocation subfield of a User Information field of the frame.

18 Claims, 11 Drawing Sheets

1100

GENERATE, BY A PROCESSOR OF AN APPARATUS, A FRAME WITH INDICATIONS OF A RESOURCE UNIT (RU) TYPE AND A DISTRIBUTED-TONE RU (DRU) DISTRIBUTION BANDWIDTH

• THE RU TYPE IS INDICATED IN A COMMON INFORMATION FIELD OR A SPECIAL USER INFORMATION FIELD OF THE FRAME, AND
• THE DRU DISTRIBUTION BANDWIDTH IS INDICATED IN A SPATIAL STREAM (SS) ALLOCATION SUBFIELD OF A USER INFORMATION FIELD OF THE FRAME

1110

TRANSMIT, BY THE PROCESSOR, THE FRAME TO ANOTHER APPARATUS
1120

(56) References Cited

U.S. PATENT DOCUMENTS

| | | |
|---|---|---|
| 2021/0360628 A1 | 11/2021 | Kim et al. |
| 2023/0104295 A1* | 4/2023 | Yang ................... H04W 52/286 |
| | | 370/329 |
| 2023/0124579 A1* | 4/2023 | Yang ................... H04L 27/2602 |
| | | 370/328 |
| 2024/0205899 A1* | 6/2024 | Gong ................... H04L 5/0092 |
| 2024/0357520 A1* | 10/2024 | Gong ................... H04W 72/23 |
| 2025/0007659 A1* | 1/2025 | Yang .................... H04L 27/262 |

FOREIGN PATENT DOCUMENTS

| | | |
|---|---|---|
| EP | 4040708 A1 | 8/2022 |
| KR | 20210141314 A | 11/2021 |
| TW | 202135583 A | 9/2021 |
| WO | WO 2021035406 A1 | 3/2021 |

OTHER PUBLICATIONS

European Patent Office, Extended European Search Report in European Patent Application No. 22211444.9, May 8, 2023.

Hu Mengshi et al: "Multi-RU Indication in Trigger Frame", IEEE 802.1-20/0416R0, Mar. 13, 2020, XP055869663.

Deng Cailian et al: "IEEE 802.11be Wi-Fi 7: New Challenges and Opportunities", IEEE Communications Surveys & Tutorials, vol. 22, No. 4, Aug. 3, 2020, pp. 2136-2166, XP055911229.

China National Intellectual Property Administration, First Office Action in China Patent Application No. 202211559818.8, Mar. 15, 2025.

Interdigital Communications, LLC, "Reference Signals for ePDCCH", R1-120138, 3GPP TSG RAN WG1 RL1, Feb. 1, 2012.

\* cited by examiner

100

STA 110

WIRELESS COMMUNICATIONS WITH COVERAGE ENHANCEMENT FOR 6GHZ LONG-RANGE INDOOR (LPI) APPLICATIONS

STA 120

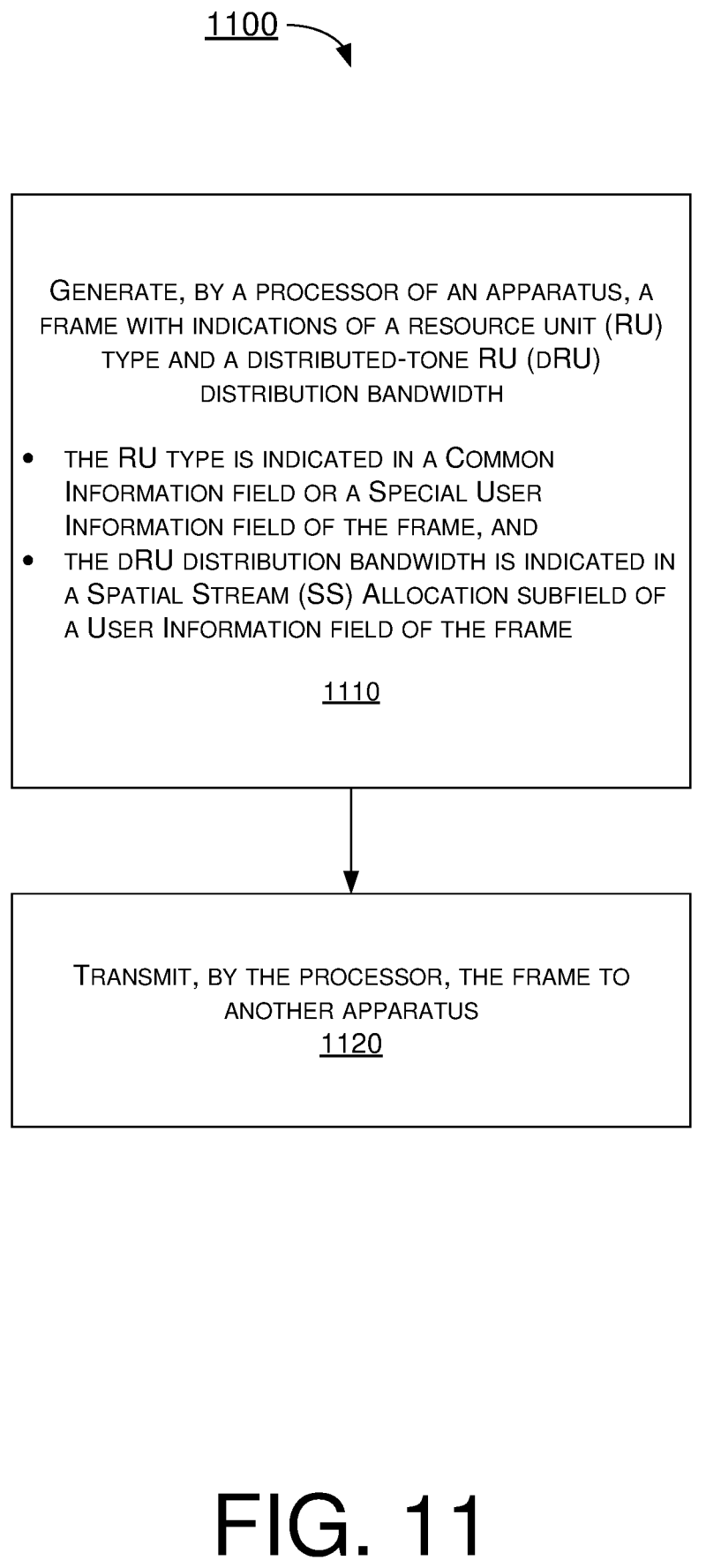

1100

GENERATE, BY A PROCESSOR OF AN APPARATUS, A FRAME WITH INDICATIONS OF A RESOURCE UNIT (RU) TYPE AND A DISTRIBUTED-TONE RU (DRU) DISTRIBUTION BANDWIDTH

- THE RU TYPE IS INDICATED IN A COMMON INFORMATION FIELD OR A SPECIAL USER INFORMATION FIELD OF THE FRAME, AND
- THE DRU DISTRIBUTION BANDWIDTH IS INDICATED IN A SPATIAL STREAM (SS) ALLOCATION SUBFIELD OF A USER INFORMATION FIELD OF THE FRAME

1110

TRANSMIT, BY THE PROCESSOR, THE FRAME TO ANOTHER APPARATUS
1120

FIG. 11

DETAILED SIGNALING DESIGNS FOR DISTRIBUTED-TONE RESOURCE UNIT TRANSMISSION

CROSS REFERENCE TO RELATED PATENT APPLICATION

The present disclosure is part of a non-provisional patent application claiming the priority benefit of U.S. Provisional Patent Application No. 63/286,122, filed 6 Dec. 2021, the content of which herein being incorporated by reference in its entirety.

TECHNICAL FIELD

The present disclosure is generally related to wireless communications and, more particularly, to detailed signaling designs for distributed-tone resource unit (dRU) transmission in wireless communications.

BACKGROUND

Unless otherwise indicated herein, approaches described in this section are not prior art to the claims listed below and are not admitted as prior art by inclusion in this section.

In next-generation wireless communications, such as the 6 GHz low-power indoor (LPI) systems in accordance with the Institute of Electrical and Electronics Engineers (IEEE) standards, restrictions on power spectral density (PSD) tends to limit the coverage range, for uplink (UL) trigger-based (TB) physical-layer protocol data unit (PPDU) in particular. One approach to improving service coverage is to boost the transmit (Tx) power with the use of distributed-tone RUs (dRUs) by distributing the subcarriers, or tones, over a wider bandwidth (BW). However, one issue that needs to be addressed pertains to how to signal the resource unit (RU) type being transmitted and, in the case of dRU transmission, how to signal dRU distribution BW. Therefore, there is a need for a solution of detailed signaling designs for dRU transmission in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to detailed signaling designs for dRU transmission in wireless communications. In the present disclosure, various schemes pertaining to different options of detailed assignment of bits for dRU signaling are proposed. For instance, the RU type may be indicated in an Extremely-High-Throughput (EHT) (or future developed standards) Common Information field of a frame (e.g., trigger frame or PPDU), and the distribution bandwidth may be indicated in an EHT User Information field of the frame. Moreover, the Disregard bits in a Special User Info field or a combination of the EHT Common Information field and Special User Information field may be utilized to indicate the RU type. Thus, it is believed that various schemes proposed herein may address or otherwise alleviate aforementioned issue(s).

In one aspect, a method may involve a processor of an apparatus generating a frame with indications of a RU type and a dRU distribution bandwidth. The method may also involve the processor transmitting the frame to another apparatus. The RU type may be indicated in a Common Information field or a Special User Information field of the frame or both Common Information field and Special User Information field. The dRU distribution bandwidth may be indicated in a Spatial Stream (SS) Allocation subfield of a User Information field of the frame.

In yet another aspect, an apparatus may include a transceiver configured to communicate wirelessly and a processor coupled to the transceiver. The processor may generate a frame with indications of a RU type and a dRU distribution bandwidth. The processor may transmit, via the transceiver, the frame to another apparatus. The RU type may be indicated in a Common Information field or a Special User Information field of the frame. The dRU distribution bandwidth may be indicated in a Spatial Stream (SS) Allocation subfield of a User Information field of the frame.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 11 is a flowchart of an example process in accordance with an implementation of the present disclosure.

DETAILED DESCRIPTION OF PREFERRED EMBODIMENTS

Figure 1:
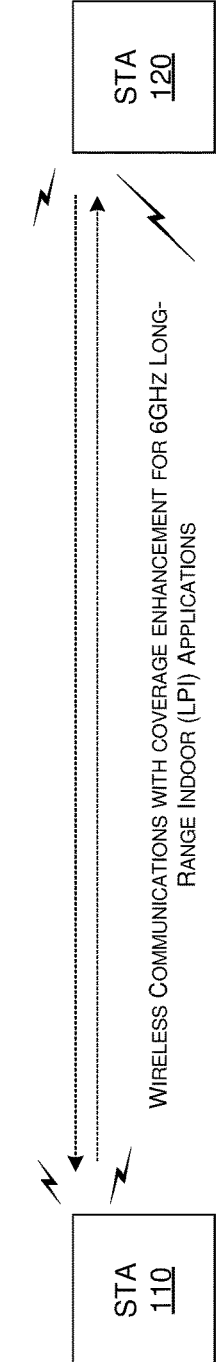
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to detailed signaling designs for dRU transmission in wireless communications. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on.

Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20, a bandwidth of 40 MHz may be interchangeably denoted as BW40, a bandwidth of 80 MHz may be interchangeably denoted as BW80, a bandwidth of 160 MHz may be interchangeably denoted as BW160, a bandwidth of 240 MHz may be interchangeably denoted as BW240, and a bandwidth of 320 MHz may be interchangeably denoted as BW320. It is further noteworthy that, in the present disclosure, a 26-tone interleaved-tone (or interlaced-tone) RU may be interchangeably denoted as iRU26 as well as dRU26 (26-tone distributed-tone RU), a 52-tone interleaved-tone (or interlaced-tone) RU may be interchangeably denoted as iRU52 as well as dRU52 (52-tone distributed-tone RU), a 106-tone interleaved-tone (or interlaced-tone) RU may be interchangeably denoted as iRU106 as well as dRU106 (106-tone distributed-tone RU), a 242-tone interleaved-tone (or interlaced-tone) RU may be interchangeably denoted as iRU242 as well as dRU242 (242-tone distributed-tone RU), and a 484-tone interleaved-tone (or interlaced-tone) RU may be interchangeably denoted as iRU484 as well as dRU484 (484-tone distributed-tone RU). It is also noteworthy that, in the present disclosure, the notion of "RU type=dRU" is equivalent to dRU enabled, and the notion of "RU type=rRU" is equivalent to dRU disabled.

FIG. 1 illustrates an example network environment 100 in which various solutions and schemes in accordance with the present disclosure may be implemented. FIG. 2~FIG. 11 illustrate examples of implementation of various proposed schemes in network environment 100 in accordance with the present disclosure. The following description of various proposed schemes is provided with reference to FIG. 1~FIG. 11.

Referring to FIG. 1, network environment 100 may involve at least a station (STA) 110 communicating wirelessly with a STA 120. Each of STA 110 and STA 120 may be a non-access point (non-AP) STA or, alternatively, either of STA 110 and STA 120 may function as an access point (AP) STA. In some cases, STA 110 and STA 120 may be associated with a basic service set (BSS) in accordance with one or more IEEE 802.11 standards (e.g., IEEE 802.11 be and future-developed standards). Each of STA 110 and STA 120 may be configured to communicate with each other by utilizing the detailed signaling designs for dRU transmission in wireless communications in accordance with various proposed schemes described below. That is, either or both of STA 110 and STA 120 may function as a "user" in the proposed schemes and examples described below. It is noteworthy that, while the various proposed schemes may be individually or separately described below, in actual implementations each of the proposed schemes may be utilized individually or separately. Alternatively, some or all of the proposed schemes may be utilized jointly.

Under a proposed scheme in accordance with the present disclosure, as a general dRU signaling design, a bitmap of up to 4 bits in the Common Info field may be utilized to indicate the RU type (e.g., whether rRU or dRU), 2 bits in the Spatial Stream (SS) Allocation subfield of the User Info field may be utilized to indicate the dRU distribution bandwidth, and 1 bit or 2 bits in the SS Allocation subfield of the User Info field may be utilized to indicate the number of spatial streams in cases of dRU transmission. For instance, regarding the 4 bits of the bitmap in the Common Info field, each bit may correspond to a respective 80 MHz frequency segment or frequency subblock and thus may indicate whether the respective 80 MHz frequency segment is used for dRU or rRU. Regarding the 2 bits for indication of the dRU distribution bandwidth, 2 bits of bits B26~B31 of the SS Allocation subfield of the User Infor field may be re-purposed for such indication. Regarding the 1 bit or 2 bits for indication of the number of spatial streams, 1 bit or 2 bits of bits B26~B31 of the SS Allocation subfield of the User Infor field may be utilized for such indication.

Under a proposed scheme in accordance with the present disclosure, each of STA 110 and STA 120 may generate a frame (e.g., trigger frame or PPDU) with indications of a RU type and a dRU distribution bandwidth. The RU type may be indicated in an EHT (or future-developed standards) Common Information field or a Special User Information field of the frame. The dRU distribution bandwidth may be indicated in a SS Allocation subfield of an EHT User Information field of the frame. Moreover, each of STA 110 and STA 120 may transmit the frame to the other STA (e.g., in a 6 GHz LPI system).

Figure 2:
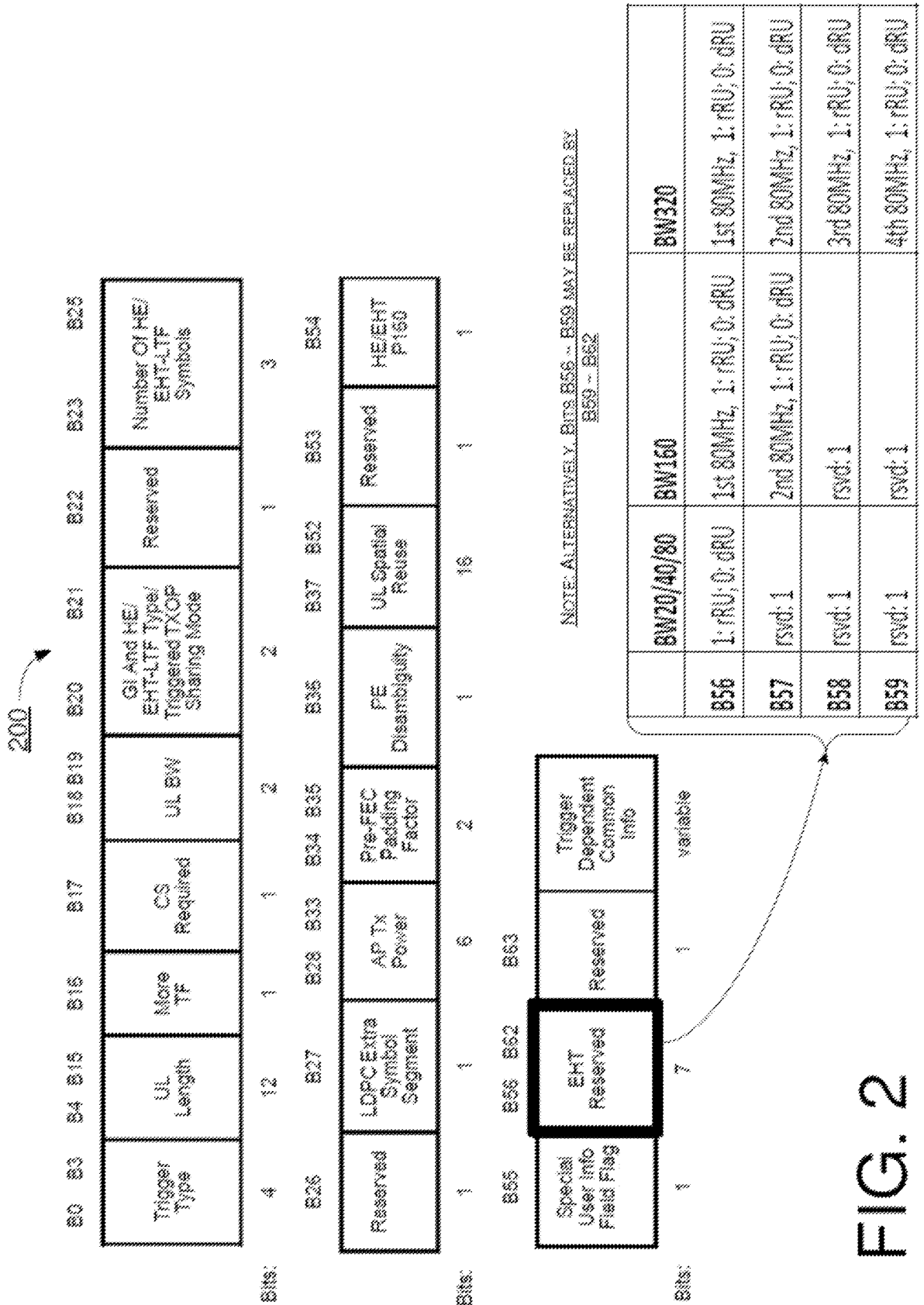
FIG. 2 is a diagram of an example design under a proposed scheme in accordance with the present disclosure.

FIG. 2 illustrates an example design 200 under a proposed scheme in accordance with the present disclosure. Design 200 may be a first option (Option-1) of dRU type indication in accordance with the present disclosure. In design 200, the RU type may be indicated by up to four consecutive bits in the EHT Common Information field. Referring to FIG. 2, the four consecutive bits may include bits B56 B59 in an EHT Reserved subfield of the EHT Common Information field. For instance: (i) responsive to a transmission bandwidth of 20 MHz, 40 MHz or 80 MHz, bit B56 may indicate the RU type as rRU or dRU for a 20 MHz, 40 MHz or 80 MHz bandwidth while bits B57~B59 are reserved; (ii) responsive to a transmission bandwidth of 160 MHz, each of bits B56 and B57 may indicate the RU type for a respective 80 MHz frequency segment of two 80 MHz frequency segments while bits B58 and B59 are reserved; and (iii) responsive to a transmission bandwidth of 320 MHz, each of bits B56~B59 may indicate the RU type for a respective 80 MHz frequency segment of four 80 MHz frequency segments.

Alternatively, the four consecutive bits may include bits B59~B62 in an EHT Reserved subfield of the EHT Common Information field. In such cases: (i) responsive to a transmission bandwidth of 20 MHz, 40 MHz or 80 MHz, bit B59 may indicate the RU type as rRU or dRU for a 20 MHz, 40 MHz or 80 MHz bandwidth while bits B60 B62 are reserved; (ii) responsive to a transmission bandwidth of 160 MHz, each of bits B59 and B60 may indicate the RU type for a respective 80 MHz frequency segment of two 80 MHz frequency segments while bits B61 and B62 are reserved; and (iii) responsive to a transmission bandwidth of 320 MHz, each of bits B59~B62 may indicate the RU type for a respective 80 MHz frequency segment of four 80 MHz frequency segments.

Figure 3:
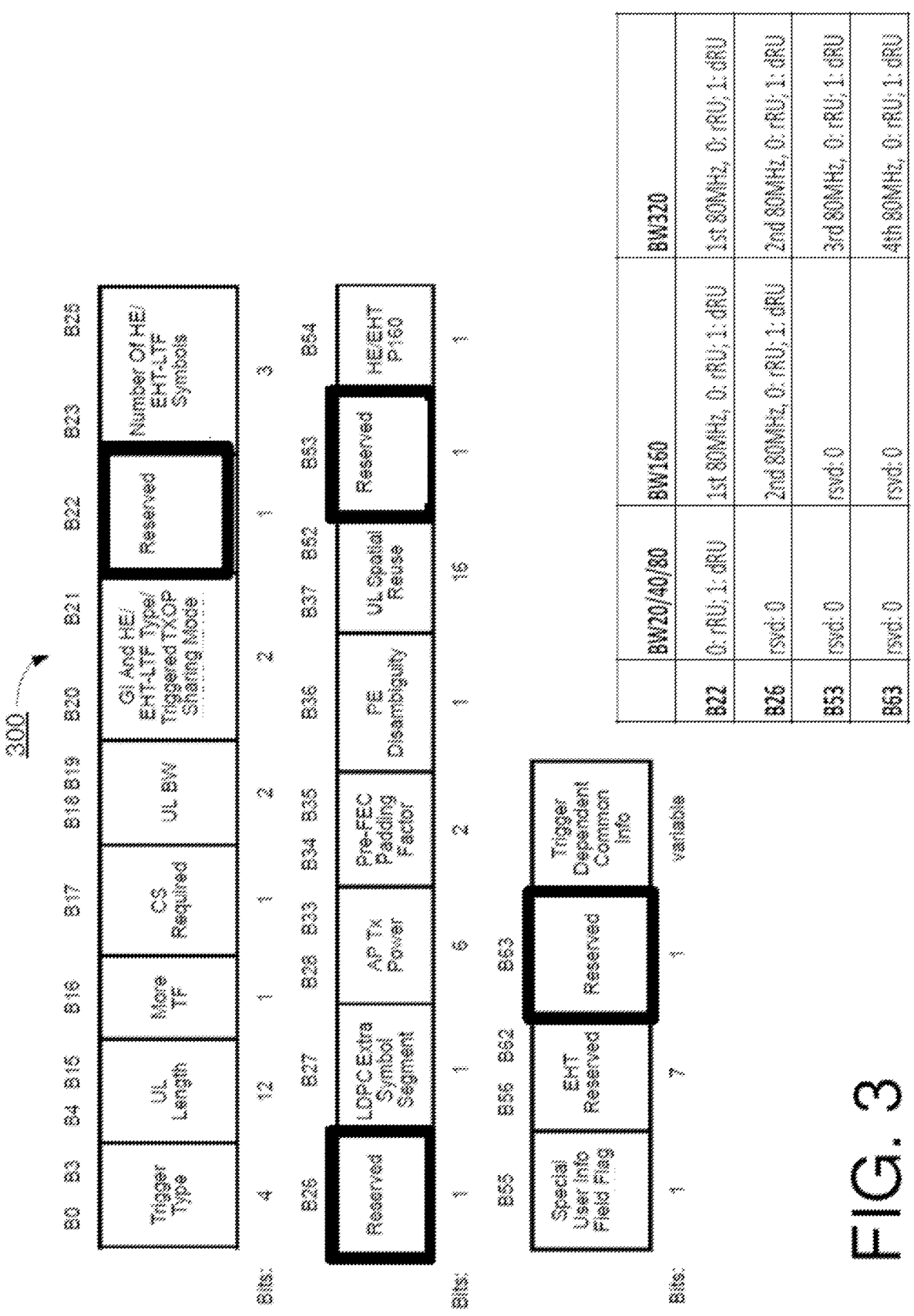
FIG. 3 is a diagram of an example design under a proposed scheme in accordance with the present disclosure.

FIG. 3 illustrates an example design 300 under a proposed scheme in accordance with the present disclosure. Design 300 may be a second option (Option-2) of dRU type indication in accordance with the present disclosure. In design 300, the RU type may be indicated by up to four non-consecutive bits in the EHT Common Information field. Referring to FIG. 3, the RU type may be indicated by up to four non-consecutive bits in the EHT Common Information field. For instance: (i) responsive to a transmission bandwidth of 20 MHz, 40 MHz or 80 MHz, bit B22 in a Reserved subfield of the EHT Common Information field may indicate the RU type as rRU or dRU for a 20 MHz, 40 MHz or 80 MHz bandwidth while bits B26, B53 and B63 are reserved; (ii) responsive to a transmission bandwidth of 160 MHz, each of bits B22 and B26 may indicate the RU type for a respective 80 MHz frequency segment of two 80 MHz frequency segments while bits B53 and B63 are reserved; and (iii) responsive to a transmission bandwidth of 320 MHz, each of bits B22, B26, B53 and B63 may indicate the RU type for a respective 80 MHz frequency segment of four 80 MHz frequency segments.

Figure 4:
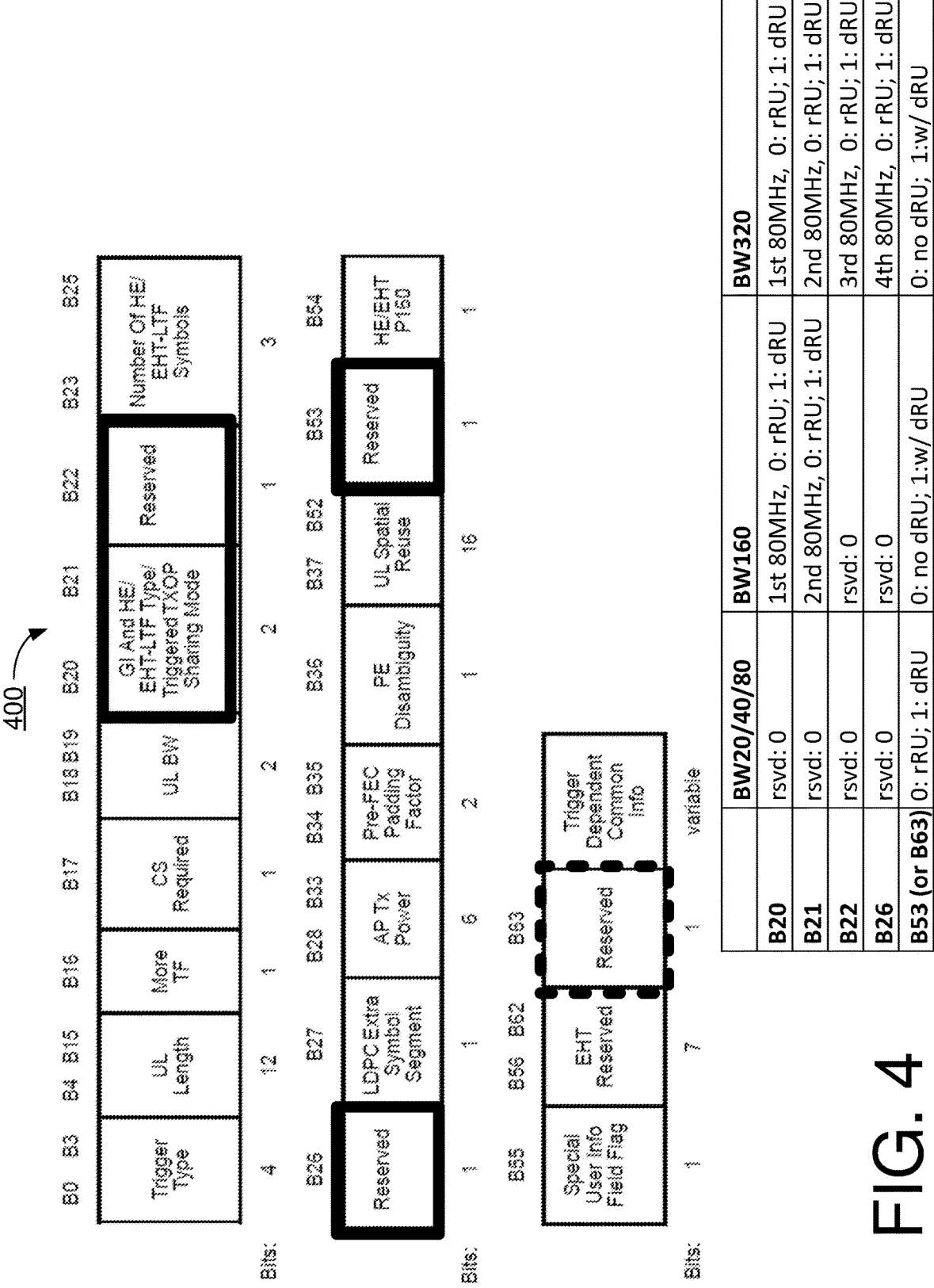
FIG. 4 is a diagram of an example design under a proposed scheme in accordance with the present disclosure.

FIG. 4 illustrates an example design 400 under a proposed scheme in accordance with the present disclosure. Design 400 may be a third option (Option-3) of dRU type indication in accordance with the present disclosure. In design 400, the RU type may be indicated by up to four non-consecutive bits in the EHT Common Information field. Referring to FIG. 4, the RU type may be indicated by up to four non-consecutive bits in the EHT Common Information field. For instance: (i) responsive to a transmission bandwidth of 20 MHz, 40 MHz or 80 MHz, bit B53 or B63 in a Reserved subfield of the EHT Common Information field may indicate the RU type as rRU or dRU for a 20 MHz, 40 MHz or 80 MHz bandwidth while bits B20, B21, B22 and B26 may be reserved; (ii) by assuming 4× EHT-LTF mode and 3.2 us gap interval (GI) is used for dRU transmission, responsive to a transmission bandwidth of 160 MHz, each of bits B20 and B21 in a GI And HE/EHT-LTF Type/Triggered TXOP Sharing Mode subfield of the EHT Common Information field may indicate the RU type for a respective 80 MHz frequency segment of two 80 MHz frequency segments while bits B22 and B26 may be reserved and while bit B53 or B63 may indicate that the RU type of at least one 80 MHz frequency segment is dRU; and (iii) responsive to a transmission bandwidth of 320 MHz, each of bits B20, B21, B22 and B26 may indicate the RU type for a respective 80 MHz frequency segment of four 80 MHz frequency segments while bit B53 or B63 may indicate that the RU type of at least one 80 MHz frequency segment is dRU.

Figure 5:
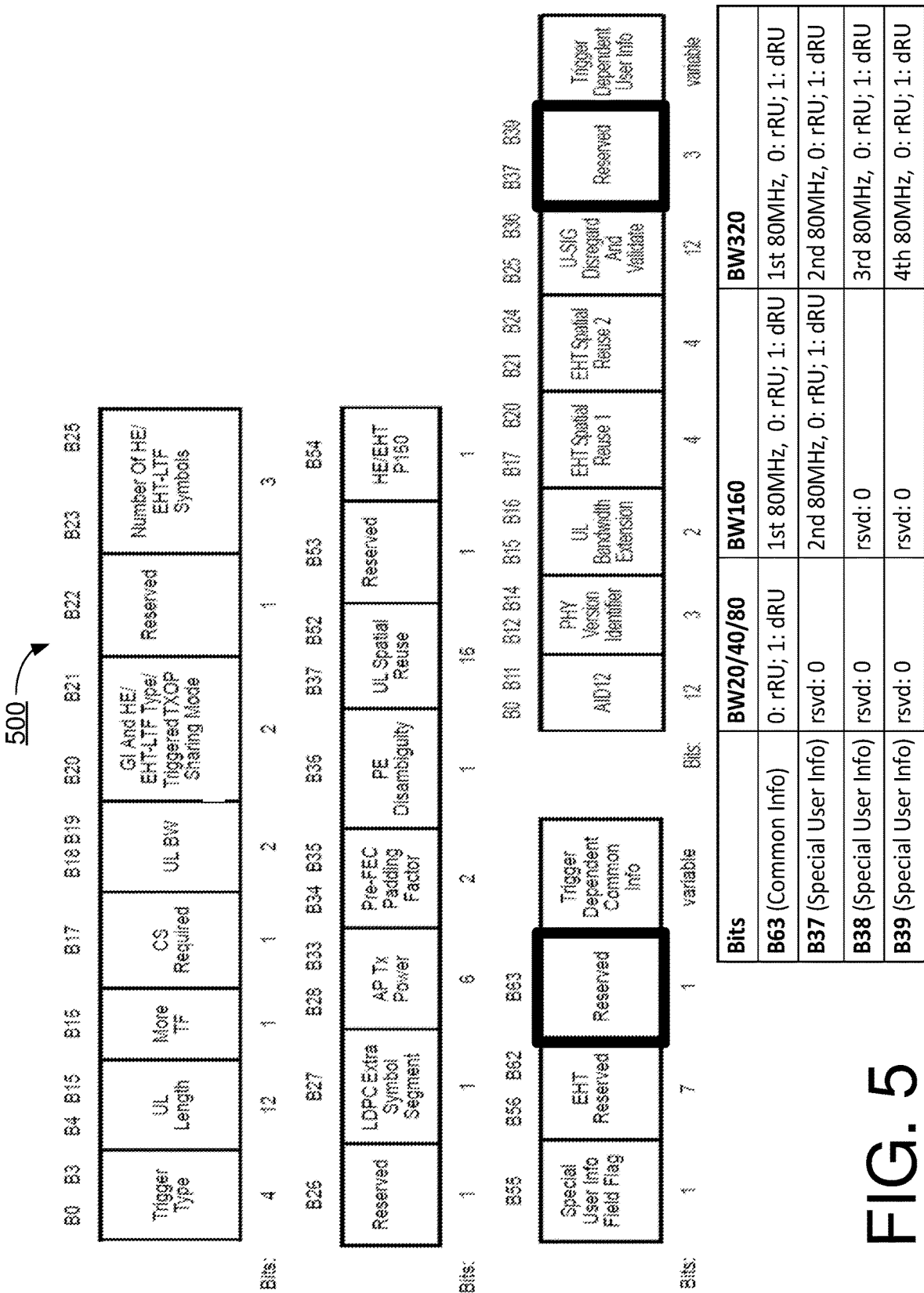
FIG. 5 is a diagram of an example design under a proposed scheme in accordance with the present disclosure.

FIG. 5 illustrates an example design 500 under a proposed scheme in accordance with the present disclosure. Design 500 may be a fourth option (Option-4) of dRU type indication in accordance with the present disclosure. In design 500, the RU type may be indicated by up to four non-consecutive bits in a combination of the EHT Common Information field and the Special User Information field of the frame. Referring to FIG. 5, the RU type may be indicated by up to four non-consecutive bits in the EHT Common Information field and the Special User Information field. For instance: (i) responsive to a transmission bandwidth of 20 MHz, 40 MHz or 80 MHz, bit B63 in a Reserved subfield of the EHT Common Information field may indicate the RU type as rRU or dRU for a 20 MHz, 40 MHz or 80 MHz bandwidth while bits B37~B39 in another Reserved subfield of the EHT Common Information field may be reserved; (ii) responsive to a transmission bandwidth of 160 MHz, each of bits B63 and B37 may indicate the RU type for a respective 80 MHz frequency segment of two 80 MHz frequency segments while bits B38 and B39 may be reserved; and (iii) responsive to a transmission bandwidth of 320 MHz, each of bits B63 and B37~B39 may indicate the RU type for a respective 80 MHz frequency segment of four 80 MHz frequency segments.

Figure 6:
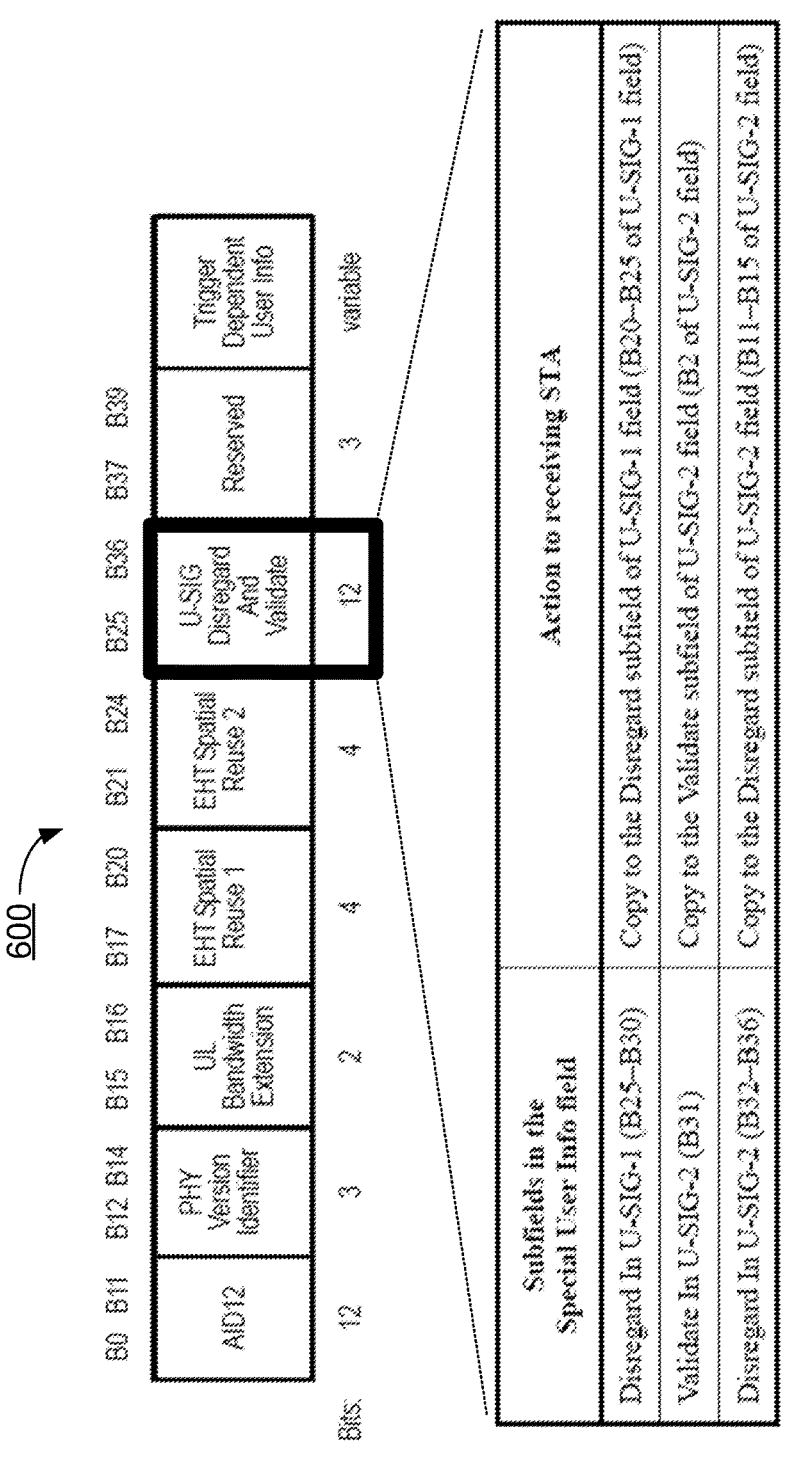
FIG. 6 is a diagram of an example design under a proposed scheme in accordance with the present disclosure.

FIG. 6 illustrates an example design 600 under a proposed scheme in accordance with the present disclosure. Design 600 may be a fifth option (Option-5) of dRU type indication in accordance with the present disclosure. In design 600, the RU type may be indicated by up to four consecutive bits in the Special User Information field. Referring to FIG. 6, the four consecutive bits may include bits B25~B28 in a Universal Signal (U-SIG) Disregard and Validate subfield of the Special User Information field. In some implementations: (i) responsive to a transmission bandwidth of 20 MHz, 40 MHz or 80 MHz, bit B25 may indicate the RU type as rRU or dRU for a 20 MHz, 40 MHz or 80 MHz bandwidth while bits B26~B28 are reserved; (ii) responsive to a transmission bandwidth of 160 MHz, each of bits B25 and B26 may indicate the RU type for a respective 80 MHz frequency segment of two 80 MHz frequency segments while bits B27 and B28 are reserved; and (iii) responsive to a transmission bandwidth of 320 MHz, each of bits B25~B28 may indicate the RU type for a respective 80 MHz frequency segment of four 80 MHz frequency segments.

Figure 7:
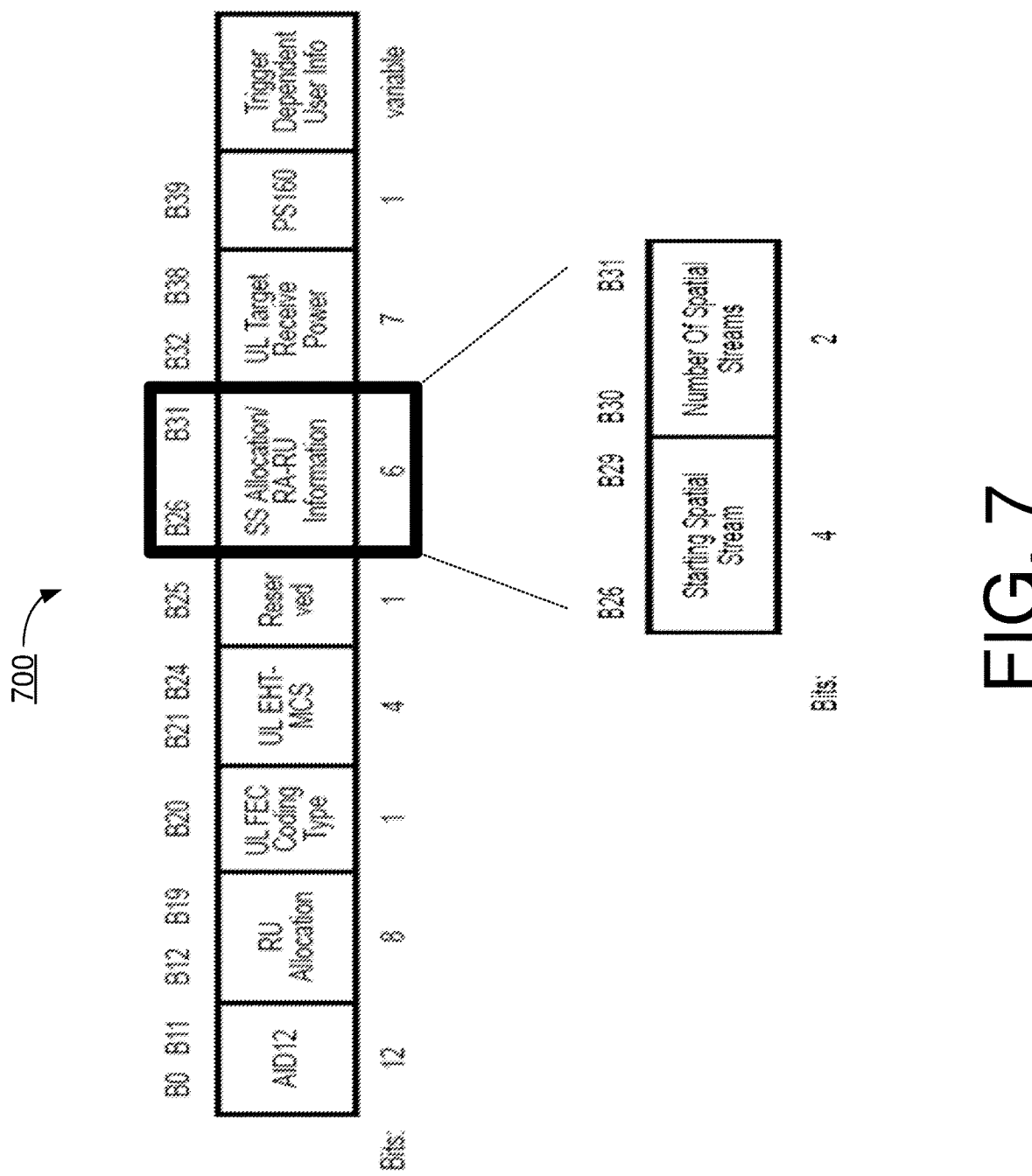
FIG. 7 is a diagram of an example design under a proposed scheme in accordance with the present disclosure.

FIG. 7 illustrates an example design 700 under a proposed scheme in accordance with the present disclosure. Design 700 pertains to indication of dRU distribution bandwidth in the SS Allocation subfield of the EHT User Information field of a frame. Referring to FIG. 7, two of the four bits B26~B29 of the SS Allocation subfield may be used to indicate the dRU distribution bandwidth. Moreover, either or both of the two bits B30 and B31 may be used to indicate a number of spatial streams used in dRU transmission. In other words, under the proposed scheme, the dRU distribution bandwidth may be indicated by three or four bits in the SS Allocation subfield of the EHT User Information field.

Figure 8:
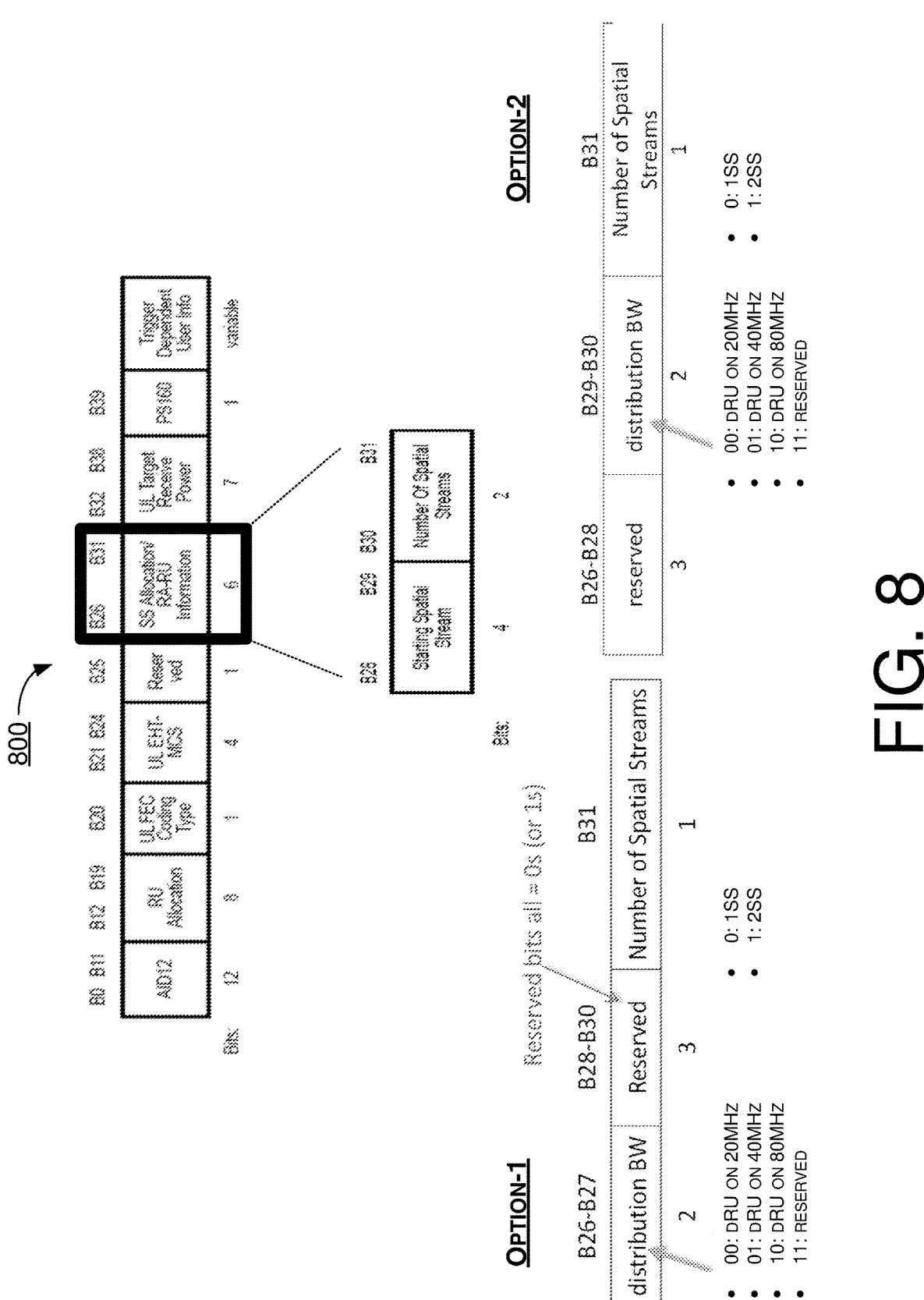
FIG. 8 is a diagram of an example design under a proposed scheme in accordance with the present disclosure.

FIG. 8 illustrates an example design 800 under a proposed scheme in accordance with the present disclosure. Design 800 may pertain to a first option (Option-1) and a second option (Option-2) of indication of dRU distribution bandwidth in accordance with the present disclosure. In Option-1 of dRU distribution bandwidth indication: (a) two bits, B26 and B27, of the SS Allocation subfield may indicate a size of a frequency segment or frequency subblock used in a dRU transmission in transmitting the frame; and (b) one bit, B31, of the SS Allocation subfield may indicate whether one or two spatial streams are used in transmitting the dRU (e.g., "0"=one spatial stream and "1"=two spatial streams, or vice versa). In Option-2 of dRU distribution bandwidth indication: (a) two bits, B29 and B30, of the SS Allocation subfield may indicate a size of a frequency segment or frequency subblock used in a dRU transmission in transmitting the frame; and (b) one bit, B31, of the SS Allocation subfield may indicate whether one or two spatial streams are used in transmitting the dRU (e.g., "0"=one spatial stream and "1"=two spatial streams, or vice versa).

In Option-1: (i) values 00 in the two bits, B26 and B27, of the SS Allocation subfield may indicate that the dRU is transmitted in a 20 MHz frequency segment used in the dRU transmission; (ii) values 01 in the two bits, B26 and B27, of the SS Allocation subfield may indicate that the dRU is transmitted in a 40 MHz frequency segment used in the dRU transmission; (iii) values 10 in the two bits, B26 and B27, of the SS Allocation subfield may indicate that the dRU is transmitted in an 80 MHz frequency segment used in the dRU transmission; and (iv) values 11 in the two bits, B26 and B27, of the SS Allocation subfield may be reserved or may indicate that the dRU is transmitted in a 160 MHz frequency subblock. Alternatively, in Option-1: (i) values 01 in the two bits, B26 and B27, of the SS Allocation subfield may indicate that the dRU is transmitted in a 20 MHz frequency segment used in the dRU transmission; (ii) values 10 in the two bits, B26 and B27, of the SS Allocation subfield may indicate that the dRU is transmitted in a 40 MHz frequency segment used in the dRU transmission; (iii) values 11 in the two bits, B26 and B27, of the SS Allocation subfield may indicate that the dRU is transmitted in an 80 MHz frequency segment used in the dRU transmission; and (iv) values 00 in the two bits, B26 and B27, of the SS Allocation subfield may be reserved.

In Option-2: (i) values 00 in the two bits, B29 and B30, of the SS Allocation subfield may indicate that the dRU is transmitted in a 20 MHz frequency segment used in the dRU transmission; (ii) values 01 in the two bits, B29 and B30, of the SS Allocation subfield may indicate that the dRU is transmitted in a 40 MHz frequency segment used in the dRU transmission; (iii) values 10 in the two bits, B29 and B30, of the SS Allocation subfield may indicate that the dRU is transmitted in an 80 MHz frequency segment used in the dRU transmission; and (iv) values 11 in the two bits, B29 and B30, of the SS Allocation subfield may be reserved or may indicate that the dRU is transmitted in a 160 MHz frequency subblock. Alternatively, in Option-2: (i) values 01 in the two bits, B29 and B30, of the SS Allocation subfield may indicate that the dRU is transmitted in a 20 MHz frequency segment used in the dRU transmission; (ii) values 10 in the two bits, B29 and B30, of the SS Allocation subfield may indicate that the dRU is transmitted in a 40 MHz frequency segment used in the dRU transmission; (iii) values 11 in the two bits, B29 and B30, of the SS Allocation subfield may indicate that the dRU is transmitted in an 80 MHz frequency segment used in the dRU transmission; and (iv) values 00 in the two bits, B29 and B30, of the SS Allocation subfield may be reserved.

Figure 9:
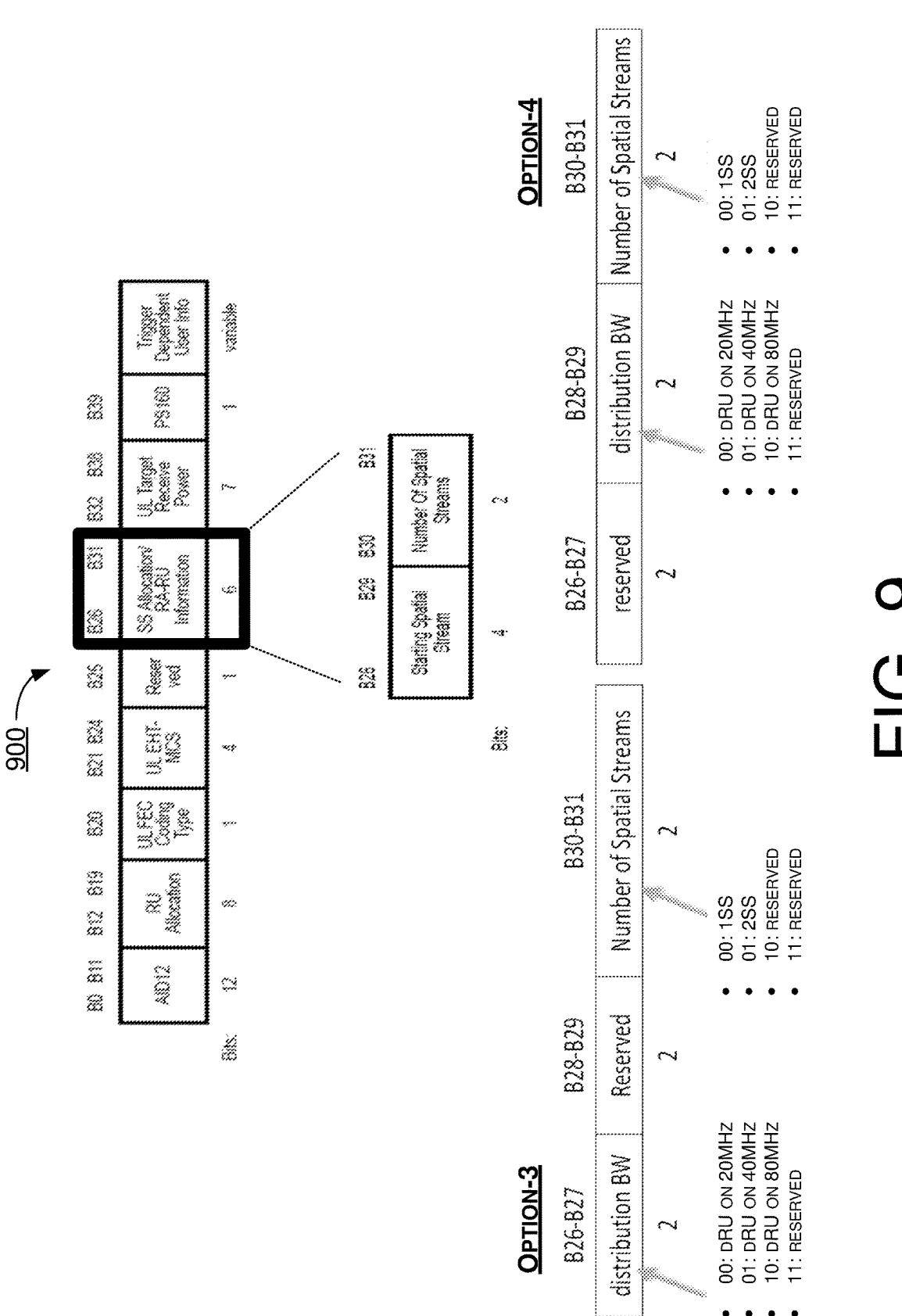
FIG. 9 is a diagram of an example design under a proposed scheme in accordance with the present disclosure.

FIG. 9 illustrates an example design 900 under a proposed scheme in accordance with the present disclosure. Design 900 may pertain to a third option (Option-3) and a fourth option (Option-4) of indication of dRU distribution bandwidth in accordance with the present disclosure. In Option-3 of dRU distribution bandwidth indication: (a) two bits, B26 and B27, of the SS Allocation subfield may indicate whether a dRU is transmitted in a 20 MHz, 40 MHz, 80 MHz or 160 MHz frequency segment in transmitting the frame, and (b) two bits, B30 and B31, of the SS Allocation subfield may indicate whether one or two spatial streams are used in transmitting the dRU (e.g., "00"=one spatial stream and "01"=two spatial streams, with "10" and "11" being reserved). In Option-4 of dRU distribution bandwidth indication: (a) two bits, B28 and B29, of the SS Allocation subfield may indicate whether a dRU is transmitted in a 20 MHz, 40 MHz, 80 MHz or 160 MHz frequency segment in transmitting the frame, and (b) two bits, B30 and B31, of the SS Allocation subfield may indicate whether one or two spatial streams are used in transmitting the dRU (e.g., "00"=one spatial stream and "01"=two spatial streams, with "10" and "11" being reserved).

In Option-3: (i) values 00 in the two bits, B26 and B27, of the SS Allocation subfield may indicate that the dRU is transmitted in a 20 MHz frequency segment used in the dRU transmission; (ii) values 01 in the two bits, B26 and B27, of the SS Allocation subfield may indicate that the dRU is transmitted in a 40 MHz frequency segment used in the dRU transmission; (iii) values 10 in the two bits, B26 and B27, of the SS Allocation subfield may indicate that the dRU is transmitted in an 80 MHz frequency segment used in the dRU transmission; and (iv) values 11 in the two bits, B26 and B27, of the SS Allocation subfield may be reserved or may indicate that the dRU is transmitted in a 160 MHz frequency subblock. Alternatively, in Option-3: (i) values 01 in the two bits, B26 and B27, of the SS Allocation subfield may indicate that the dRU is transmitted in a 20 MHz frequency segment used in the dRU transmission; (ii) values 10 in the two bits, B26 and B27, of the SS Allocation subfield may indicate that the dRU is transmitted in a 40 MHz frequency segment used in the dRU transmission; (iii) values 11 in the two bits, B26 and B27, of the SS Allocation subfield may indicate that the dRU is transmitted in an 80 MHz frequency segment used in the dRU transmission; and (iv) values 00 in the two bits, B26 and B27, of the SS Allocation subfield may be reserved or may indicate that the dRU is transmitted in a 160 MHz frequency subblock.

In Option-4: (i) values 00 in the two bits, B28 and B29, of the SS Allocation subfield may indicate that the dRU is transmitted in a 20 MHz frequency segment used in the dRU transmission; (ii) values 01 in the two bits, B28 and B29, of the SS Allocation subfield may indicate that the dRU is transmitted in a 40 MHz frequency segment used in the dRU transmission; (iii) values 10 in the two bits, B28 and B29, of the SS Allocation subfield may indicate that the dRU is transmitted in an 80 MHz frequency segment used in the dRU transmission; and (iv) values 11 in the two bits, B28 and B29, of the SS Allocation subfield may be reserved. Alternatively, in Option-4: (i) values 01 in the two bits, B28 and B29, of the SS Allocation subfield may indicate that the dRU is transmitted in a 20 MHz frequency segment used in the dRU transmission; (ii) values 10 in the two bits, B28 and B29, of the SS Allocation subfield may indicate that the dRU is transmitted in a 40 MHz frequency segment used in the dRU transmission; (iii) values 11 in the two bits, B28 and B29, of the SS Allocation subfield may indicate that the dRU is transmitted in an 80 MHz frequency segment used in the dRU transmission; and (iv) values 00 in the two bits, B28 and B29, of the SS Allocation subfield may be reserved.

Illustrative Implementations

Figure 10:
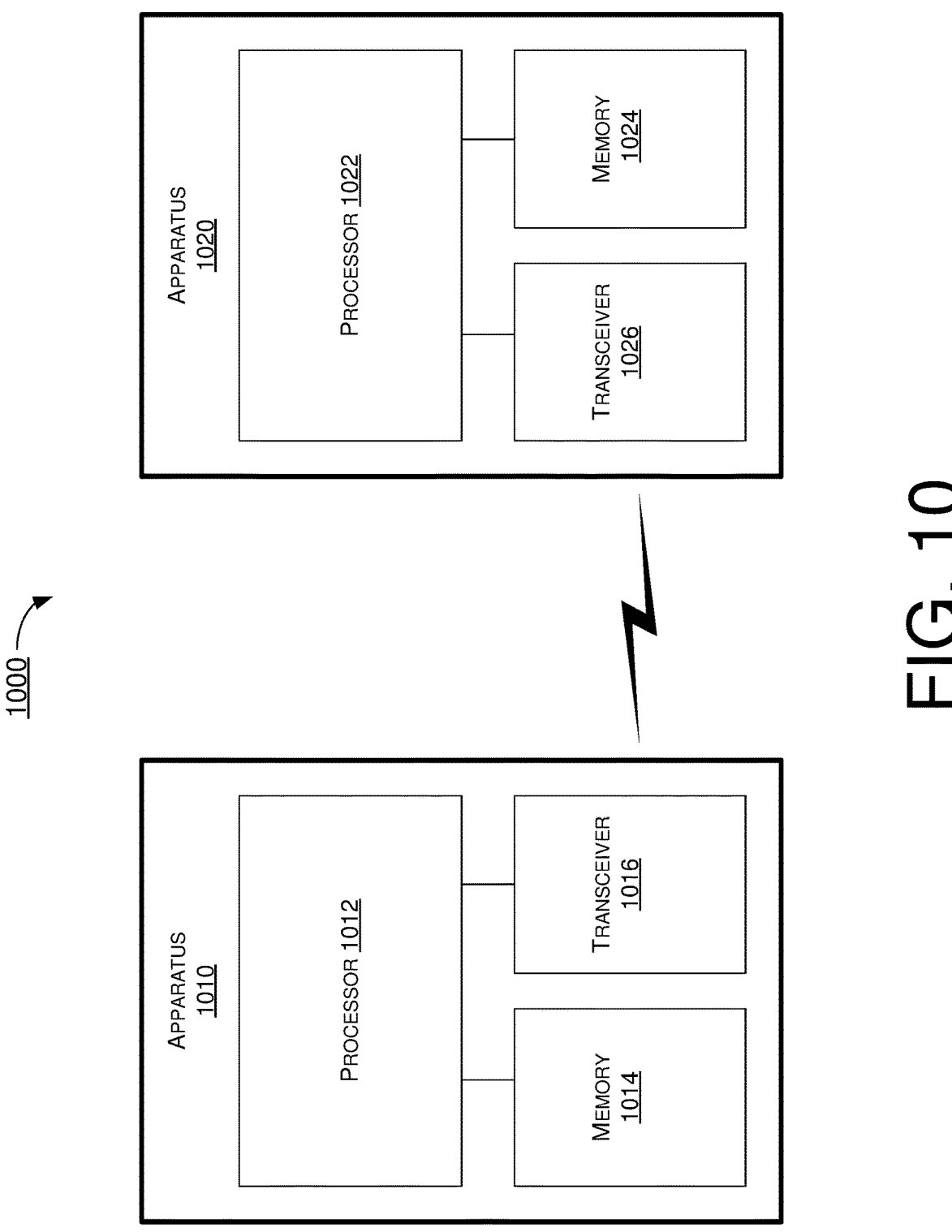
FIG. 10 is a block diagram of an example communication system in accordance with an implementation of the present disclosure.

FIG. 10 illustrates an example system 1000 having at least an example apparatus 1010 and an example apparatus 1020 in accordance with an implementation of the present disclosure. Each of apparatus 1010 and apparatus 1020 may perform various functions to implement schemes, techniques, processes and methods described herein pertaining to detailed signaling designs for dRU transmission in wireless communications, including the various schemes described above with respect to various proposed designs, concepts, schemes, systems and methods described above as well as processes described below. For instance, apparatus 1010 may be implemented in STA 110 and apparatus 1020 may be implemented in STA 120, or vice versa.

Each of apparatus 1010 and apparatus 1020 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 1010 and apparatus 1020 may be implemented in a smartphone, a smart watch, a personal digital assistant, a digital camera, or a computing equipment such as a tablet computer, a laptop computer or a notebook computer. Each of apparatus 1010 and apparatus 1020 may also be a part of a machine type apparatus, which may be an IoT apparatus such as an immobile or a stationary apparatus, a home apparatus, a wire communication apparatus or a computing apparatus. For instance, each of apparatus 1010 and apparatus 1020 may be implemented in a smart thermostat, a smart fridge, a smart door lock, a wireless speaker or a home control center. When implemented in or as a network apparatus, apparatus 1010 and/or apparatus 1020 may be implemented in a network node, such as an AP in a WLAN.

In some implementations, each of apparatus 1010 and apparatus 1020 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1010 and apparatus 1020 may be implemented in or as a STA or an AP. Each of apparatus 1010 and apparatus 1020 may include at least some of those components shown in FIG. 10 such as a processor 1012 and a processor 1022, respectively, for example. Each of apparatus 1010 and apparatus 1020 may further include one or more other components not pertinent to the proposed scheme of the present disclosure (e.g., internal power supply, display device and/or user interface device), and, thus, such component(s) of apparatus 1010 and apparatus 1020 are neither shown in FIG. 10 nor described below in the interest of simplicity and brevity.

In one aspect, each of processor 1012 and processor 1022 may be implemented in the form of one or more single-core processors, one or more multi-core processors, one or more RISC processors or one or more CISC processors. That is, even though a singular term "a processor" is used herein to refer to processor 1012 and processor 1022, each of processor 1012 and processor 1022 may include multiple processors in some implementations and a single processor in other implementations in accordance with the present disclosure. In another aspect, each of processor 1012 and processor 1022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1012 and processor 1022 is a special-purpose machine specifically designed, arranged and configured to perform specific tasks including those pertaining to detailed signaling designs for dRU transmission in wireless communications in accordance with various implementations of the present disclosure.

In some implementations, apparatus 1010 may also include a transceiver 1016 coupled to processor 1012. Transceiver 1016 may include a transmitter capable of wirelessly transmitting and a receiver capable of wirelessly receiving data. In some implementations, apparatus 1020 may also include a transceiver 1026 coupled to processor 1022. Transceiver 1026 may include a transmitter capable of wirelessly transmitting and a receiver capable of wirelessly receiving data. It is noteworthy that, although transceiver 1016 and transceiver 1026 are illustrated as being external to and separate from processor 1012 and processor 1022, respectively, in some implementations, transceiver 1016 may be an integral part of processor 1012 as a system on chip (SoC) and/or transceiver 1026 may be an integral part of processor 1022 as a SoC.

In some implementations, apparatus 1010 may further include a memory 1014 coupled to processor 1012 and capable of being accessed by processor 1012 and storing data therein. In some implementations, apparatus 1020 may further include a memory 1024 coupled to processor 1022 and capable of being accessed by processor 1022 and storing data therein. Each of memory 1014 and memory 1024 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1014 and memory 1024 may include a type of read-only memory (ROM) such as mask ROM, programmable ROM (PROM), erasable programmable ROM (EPROM) and/or electrically erasable programmable ROM (EEPROM). Alternatively, or additionally, each of memory 1014 and memory 1024 may include a type of non-volatile random-access memory (NVRAM) such as flash memory, solid-state memory, ferroelectric RAM (FeRAM), magnetoresistive RAM (MRAM) and/or phase-change memory.

Each of apparatus 1010 and apparatus 1020 may be a communication entity capable of communicating with each other using various proposed schemes in accordance with the present disclosure. For illustrative purposes and without limitation, a description of capabilities of apparatus 1010, as STA 110, and apparatus 1020, as STA 120, is provided below. It is noteworthy that, although a detailed description of capabilities, functionalities and/or technical features of apparatus 1020 is provided below, the same may be applied to apparatus 1010 although a detailed description thereof is not provided solely in the interest of brevity. It is also noteworthy that, although the example implementations described below are provided in the context of WLAN, the same may be implemented in other types of networks.

Under various proposed schemes pertaining to detailed signaling designs for dRU transmission in wireless communications in accordance with the present disclosure, with apparatus 1010 implemented in or as STA 110 functioning as a non-AP STA and apparatus 1020 implemented in or as STA 120 functioning as an AP STA in network environment 100, processor 1022 of apparatus 1020 may generate a frame (e.g., trigger frame or PPDU) with indications of a RU type and a dRU distribution bandwidth. The RU type may be indicated in a Common Information field or a Special User Information field of the frame. The dRU distribution bandwidth may be indicated in a SS Allocation subfield of a User Information field of the frame. Moreover, processor 1022 transmitting, via transceiver 1026, the frame to another apparatus (e.g., apparatus 1010).

In some implementations, the RU type may be indicated by up to four consecutive bits in the Common Information field.

In some implementations, the four consecutive bits may include bits B56 B59 in a Reserved subfield of the Common Information field. In some implementations: (i) responsive to a transmission bandwidth of 20 MHz, 40 MHz or 80 MHz, bit B56 may indicate the RU type as rRU or dRU for a 20 MHz, 40 MHz or 80 MHz bandwidth while bits B57~B59 are reserved; (ii) responsive to a transmission bandwidth of 160 MHz, each of bits B56 and B57 may indicate the RU type for a respective 80 MHz frequency segment of two 80 MHz frequency segments while bits B58 and B59 are reserved; and (iii) responsive to a transmission bandwidth of 320 MHz, each of bits B56~B59 may indicate the RU type for a respective 80 MHz frequency segment of four 80 MHz frequency segments.

In some implementations, the four consecutive bits may include bits B59~B62 in a Reserved subfield of the Common Information field. In some implementations: (i) responsive to a transmission bandwidth of 20 MHz, 40 MHz or 80 MHz, bit B59 may indicate the RU type as rRU or dRU for a 20 MHz, 40 MHz or 80 MHz bandwidth while bits B60~B62 are reserved; (ii) responsive to a transmission bandwidth of 160 MHz, each of bits B59 and B60 may indicate the RU type for a respective 80 MHz frequency segment of two 80 MHz frequency segments while bits B61 and B62 are reserved; and (iii) responsive to a transmission bandwidth of 320 MHz, each of bits B59~B62 may indicate the RU type for a respective 80 MHz frequency segment of four 80 MHz frequency segments.

In some implementations, the four consecutive bits may include bits B25 B28 in a U-SIG Disregard and Validate subfield of the Special User Information field. In some implementations: (i) responsive to a transmission bandwidth of 20 MHz, 40 MHz or 80 MHz, bit B25 may indicate the RU type as rRU or dRU for a 20 MHz, 40 MHz or 80 MHz bandwidth while bits B26~B28 are reserved; (ii) responsive to a transmission bandwidth of 160 MHz, each of bits B25 and B26 may indicate the RU type for a respective 80 MHz frequency segment of two 80 MHz frequency segments while bits B27 and B28 are reserved; and (iii) responsive to a transmission bandwidth of 320 MHz, each of bits B25~B28 may indicate the RU type for a respective 80 MHz frequency segment of four 80 MHz frequency segments.

In some implementations, the RU type may be indicated by up to four non-consecutive bits in the Common Information field or a combination of the Common Information field and the Special User Information field of the frame.

In some implementations: (i) responsive to a transmission bandwidth of 20 MHz, 40 MHz or 80 MHz, bit B22 in a Reserved subfield of the Common Information field may indicate the RU type as rRU or dRU for a 20 MHz, 40 MHz or 80 MHz bandwidth while bits B26, B53 and B63 are reserved; (ii) responsive to a transmission bandwidth of 160 MHz, each of bits B22 and B26 may indicate the RU type for a respective 80 MHz frequency segment of two 80 MHz frequency segments while bits B53 and B63 are reserved; and (iii) responsive to a transmission bandwidth of 320 MHz, each of bits B22, B26, B53 and B63 may indicate the RU type for a respective 80 MHz frequency segment of four 80 MHz frequency segments.

Alternatively: (i) responsive to a transmission bandwidth of 20 MHz, 40 MHz or 80 MHz, bit B53 or B63 in a Reserved subfield of the Common Information field may indicate the RU type as rRU or dRU for a 20 MHz, 40 MHz or 80 MHz bandwidth while bits B20, B21, B22 and B26 may be reserved; (ii) responsive to a transmission bandwidth of 160 MHz, each of bits B20 and B21 in a GI And HE/EHT-LTF Type/Triggered TXOP Sharing Mode subfield of the Common Information field may indicate the RU type for a respective 80 MHz frequency segment of two 80 MHz frequency segments while bits B22 and B26 may be reserved and while bit B53 or B63 may indicate that the RU type of at least one 80 MHz frequency segment is dRU; and (iii) responsive to a transmission bandwidth of 320 MHz, each of bits B20, B21, B22 and B26 may indicate the RU type for a respective 80 MHz frequency segment of four 80 MHz frequency segments while bit B53 or B63 may indicate that the RU type of at least one 80 MHz frequency segment is dRU.

Alternatively: (i) responsive to a transmission bandwidth of 20 MHz, 40 MHz or 80 MHz, bit B63 in a Reserved subfield of the Common Information field may indicate the RU type as rRU or dRU for a 20 MHz, 40 MHz or 80 MHz bandwidth while bits B37 B39 in another Reserved subfield of the Special User Information field may be reserved; (ii) responsive to a transmission bandwidth of 160 MHz, each of bits B63 and B21 may indicate the RU type for a respective 80 MHz frequency segment of two 80 MHz frequency segments while bits B38 and B39 may be reserved; and (iii) responsive to a transmission bandwidth of 320 MHz, each of bits B63 and B37~B39 may indicate the RU type for a respective 80 MHz frequency segment of four 80 MHz frequency segments.

In some implementations, the dRU distribution bandwidth may be indicated by three or four bits in the SS Allocation subfield of the User Information field.

In some implementations: (a) two bits, B26 and B27, of the SS Allocation subfield may indicate a size of a frequency segment used in a dRU transmission in transmitting the frame; and (b) one bit, B31, of the SS Allocation subfield may indicate whether one or two spatial streams are used in transmitting the dRU. In some implementations: (i) values 00 in the two bits, B26 and B27, of the SS Allocation subfield may indicate that the dRU is transmitted in a 20 MHz frequency segment used in the dRU transmission; (ii)

values 01 in the two bits, B26 and B27, of the SS Allocation subfield may indicate that the dRU is transmitted in a 40 MHz frequency segment used in the dRU transmission; (iii) values 10 in the two bits, B26 and B27, of the SS Allocation subfield may indicate that the dRU is transmitted in an 80 MHz frequency segment used in the dRU transmission; and (iv) values 11 in the two bits, B26 and B27, of the SS Allocation subfield may be reserved or may indicate that the dRU is transmitted in a 160 MHz frequency subblock. Alternatively: (i) values 01 in the two bits, B26 and B27, of the SS Allocation subfield may indicate that the dRU is transmitted in a 20 MHz frequency segment used in the dRU transmission; (ii) values 10 in the two bits, B26 and B27, of the SS Allocation subfield may indicate that the dRU is transmitted in a 40 MHz frequency segment used in the dRU transmission; (iii) values 11 in the two bits, B26 and B27, of the SS Allocation subfield may indicate that the dRU is transmitted in an 80 MHz frequency segment used in the dRU transmission; and (iv) values 00 in the two bits, B26 and B27, of the SS Allocation subfield may be reserved.

In some implementations: (a) two bits, B26 and B27, of the SS Allocation subfield may indicate whether a dRU is transmitted in a 20 MHz, 40 MHz, 80 MHz or 160 MHz frequency segment in transmitting the frame, and (b) two bits, B30 and B31, of the SS Allocation subfield may indicate whether one or two spatial streams are used in transmitting the dRU. In some implementations: (i) values 00 in the two bits, B26 and B27, of the SS Allocation subfield may indicate that the dRU is transmitted in a 20 MHz frequency segment used in the dRU transmission; (ii) values 01 in the two bits, B26 and B27, of the SS Allocation subfield may indicate that the dRU is transmitted in a 40 MHz frequency segment used in the dRU transmission; (iii) values 10 in the two bits, B26 and B27, of the SS Allocation subfield may indicate that the dRU is transmitted in an 80 MHz frequency segment used in the dRU transmission; and (iv) values 11 in the two bits, B26 and B27, of the SS Allocation subfield may be reserved or may indicate that the dRU is transmitted in a 160 MHz frequency subblock. Alternatively: (i) values 01 in the two bits, B26 and B27, of the SS Allocation subfield may indicate that the dRU is transmitted in a 20 MHz frequency segment used in the dRU transmission; (ii) values 10 in the two bits, B26 and B27, of the SS Allocation subfield may indicate that the dRU is transmitted in a 40 MHz frequency segment used in the dRU transmission; (iii) values 11 in the two bits, B26 and B27, of the SS Allocation subfield may indicate that the dRU is transmitted in an 80 MHz frequency segment used in the dRU transmission; and (iv) values 00 in the two bits, B26 and B27, of the SS Allocation subfield may be reserved or may indicate that the dRU is transmitted in a 160 MHz frequency subblock.

Illustrative Processes

FIG. 11 illustrates an example process 1100 in accordance with an implementation of the present disclosure. Process 1100 may represent an aspect of implementing various proposed designs, concepts, schemes, systems and methods described above. More specifically, process 1100 may represent an aspect of the proposed concepts and schemes pertaining to detailed signaling designs for dRU transmission in wireless communications in accordance with the present disclosure. Process 1100 may include one or more operations, actions, or functions as illustrated by one or more of blocks 1110 and 1120. Although illustrated as discrete blocks, various blocks of process 1100 may be divided into additional blocks, combined into fewer blocks, or eliminated, depending on the desired implementation.

Moreover, the blocks/sub-blocks of process 1100 may be executed in the order shown in FIG. 11 or, alternatively in a different order. Furthermore, one or more of the blocks/sub-blocks of process 1100 may be executed repeatedly or iteratively. Process 1100 may be implemented by or in apparatus 1010 and apparatus 1020 as well as any variations thereof. Solely for illustrative purposes and without limiting the scope, process 1100 is described below in the context of apparatus 1010 implemented in or as STA 110 functioning as a non-AP STA and apparatus 1020 implemented in or as STA 120 functioning as an AP STA of a wireless network such as a WLAN in network environment 110 in accordance with one or more of IEEE 802.11 standards. Process 1100 may begin at block 1110.

At 1110, process 1100 may involve processor 1022 of apparatus 1020 generating a frame (e.g., trigger frame or PPDU) with indications of a RU type and a dRU distribution bandwidth. The RU type may be indicated in a Common Information field or a Special User Information field of the frame. The dRU distribution bandwidth may be indicated in a SS Allocation subfield of a User Information field of the frame. Process 1100 may proceed from 1110 to 1120.

At 1120, process 1100 may involve processor 1022 transmitting, via transceiver 1026, the frame to another apparatus (e.g., apparatus 1010).

In some implementations, the RU type may be indicated by up to four consecutive bits in the Common Information field.

In some implementations, the four consecutive bits may include bits B56 B59 in a Reserved subfield of the Common Information field. In some implementations: (i) responsive to a transmission bandwidth of 20 MHz, 40 MHz or 80 MHz, bit B56 may indicate the RU type as rRU or dRU for a 20 MHz, 40 MHz or 80 MHz bandwidth while bits B57~B59 are reserved; (ii) responsive to a transmission bandwidth of 160 MHz, each of bits B56 and B57 may indicate the RU type for a respective 80 MHz frequency segment of two 80 MHz frequency segments while bits B58 and B59 are reserved; and (iii) responsive to a transmission bandwidth of 320 MHz, each of bits B56~B59 may indicate the RU type for a respective 80 MHz frequency segment of four 80 MHz frequency segments.

In some implementations, the four consecutive bits may include bits B59~B62 in a Reserved subfield of the Common Information field. In some implementations: (i) responsive to a transmission bandwidth of 20 MHz, 40 MHz or 80 MHz, bit B59 may indicate the RU type as rRU or dRU for a 20 MHz, 40 MHz or 80 MHz bandwidth while bits B60~B62 are reserved; (ii) responsive to a transmission bandwidth of 160 MHz, each of bits B59 and B60 may indicate the RU type for a respective 80 MHz frequency segment of two 80 MHz frequency segments while bits B61 and B62 are reserved; and (iii) responsive to a transmission bandwidth of 320 MHz, each of bits B59~B62 may indicate the RU type for a respective 80 MHz frequency segment of four 80 MHz frequency segments.

In some implementations, the four consecutive bits may include bits B25 B28 in a U-SIG Disregard and Validate subfield of the Special User Information field. In some implementations: (i) responsive to a transmission bandwidth of 20 MHz, 40 MHz or 80 MHz, bit B25 may indicate the RU type as rRU or dRU for a 20 MHz, 40 MHz or 80 MHz bandwidth while bits B26~B28 are reserved; (ii) responsive to a transmission bandwidth of 160 MHz, each of bits B25 and B26 may indicate the RU type for a respective 80 MHz frequency segment of two 80 MHz frequency segments while bits B27 and B28 are reserved; and (iii) responsive to a transmission bandwidth of 320 MHz, each of bits B25~B28 may indicate the RU type for a respective 80 MHz frequency segment of four 80 MHz frequency segments.

In some implementations, the RU type may be indicated by up to four non-consecutive bits in the Common Information field or a combination of the Common Information field and the Special User Information field of the frame.

In some implementations: (i) responsive to a transmission bandwidth of 20 MHz, 40 MHz or 80 MHz, bit B22 in a Reserved subfield of the Common Information field may indicate the RU type as rRU or dRU for a 20 MHz, 40 MHz or 80 MHz bandwidth while bits B26, B53 and B63 are reserved; (ii) responsive to a transmission bandwidth of 160 MHz, each of bits B22 and B26 may indicate the RU type for a respective 80 MHz frequency segment of two 80 MHz frequency segments while bits B53 and B63 are reserved; and (iii) responsive to a transmission bandwidth of 320 MHz, each of bits B22, B26, B53 and B63 may indicate the RU type for a respective 80 MHz frequency segment of four 80 MHz frequency segments.

Alternatively: (i) responsive to a transmission bandwidth of 20 MHz, 40 MHz or 80 MHz, bit B53 or B63 in a Reserved subfield of the Common Information field may indicate the RU type as rRU or dRU for a 20 MHz, 40 MHz or 80 MHz bandwidth while bits B20, B21, B22 and B26 may be reserved; (ii) responsive to a transmission bandwidth of 160 MHz, each of bits B20 and B21 in a GI And HE/EHT-LTF Type/Triggered TXOP Sharing Mode subfield of the Common Information field may indicate the RU type for a respective 80 MHz frequency segment of two 80 MHz frequency segments while bits B22 and B26 may be reserved and while bit B53 or B63 may indicate that the RU type of at least one 80 MHz frequency segment is dRU; and (iii) responsive to a transmission bandwidth of 320 MHz, each of bits B20, B21, B22 and B26 may indicate the RU type for a respective 80 MHz frequency segment of four 80 MHz frequency segments while bit B53 or B63 may indicate that the RU type of at least one 80 MHz frequency segment is dRU.

Alternatively: (i) responsive to a transmission bandwidth of 20 MHz, 40 MHz or 80 MHz, bit B63 in a Reserved subfield of the Common Information field may indicate the RU type as rRU or dRU for a 20 MHz, 40 MHz or 80 MHz bandwidth while bits B37 B39 in another Reserved subfield of the Special User Information field may be reserved; (ii) responsive to a transmission bandwidth of 160 MHz, each of bits B63 and B21 may indicate the RU type for a respective 80 MHz frequency segment of two 80 MHz frequency segments while bits B38 and B39 may be reserved; and (iii) responsive to a transmission bandwidth of 320 MHz, each of bits B63 and B37~B39 may indicate the RU type for a respective 80 MHz frequency segment of four 80 MHz frequency segments.

In some implementations, the dRU distribution bandwidth may be indicated by three or four bits in the SS Allocation subfield of the User Information field.

In some implementations: (a) two bits, B26 and B27, of the SS Allocation subfield may indicate a size of a frequency segment used in a dRU transmission in transmitting the frame; and (b) one bit, B31, of the SS Allocation subfield may indicate whether one or two spatial streams are used in transmitting the dRU. In some implementations: (i) values 00 in the two bits, B26 and B27, of the SS Allocation subfield may indicate that the dRU is transmitted in a 20 MHz frequency segment used in the dRU transmission; (ii) values 01 in the two bits, B26 and B27, of the SS Allocation subfield may indicate that the dRU is transmitted in a 40

MHz frequency segment used in the dRU transmission; (iii) values 10 in the two bits, B26 and B27, of the SS Allocation subfield may indicate that the dRU is transmitted in an 80 MHz frequency segment used in the dRU transmission; and (iv) values 11 in the two bits, B26 and B27, of the SS Allocation subfield may be reserved or may indicate that the dRU is transmitted in a 160 MHz frequency subblock. Alternatively: (i) values 01 in the two bits, B26 and B27, of the SS Allocation subfield may indicate that the dRU is transmitted in a 20 MHz frequency segment used in the dRU transmission; (ii) values 10 in the two bits, B26 and B27, of the SS Allocation subfield may indicate that the dRU is transmitted in a 40 MHz frequency segment used in the dRU transmission; (iii) values 11 in the two bits, B26 and B27, of the SS Allocation subfield may indicate that the dRU is transmitted in an 80 MHz frequency segment used in the dRU transmission; and (iv) values 00 in the two bits, B26 and B27, of the SS Allocation subfield may be reserved.

In some implementations: (a) two bits, B26 and B27, of the SS Allocation subfield may indicate whether a dRU is transmitted in a 20 MHz, 40 MHz, 80 MHz or 160 MHz frequency segment in transmitting the frame, and (b) two bits, B30 and B31, of the SS Allocation subfield may indicate whether one or two spatial streams are used in transmitting the dRU. In some implementations: (i) values 00 in the two bits, B26 and B27, of the SS Allocation subfield may indicate that the dRU is transmitted in a 20 MHz frequency segment used in the dRU transmission; (ii) values 01 in the two bits, B26 and B27, of the SS Allocation subfield may indicate that the dRU is transmitted in a 40 MHz frequency segment used in the dRU transmission; (iii) values 10 in the two bits, B26 and B27, of the SS Allocation subfield may indicate that the dRU is transmitted in an 80 MHz frequency segment used in the dRU transmission; and (iv) values 11 in the two bits, B26 and B27, of the SS Allocation subfield may be reserved or may indicate that the dRU is transmitted in a 160 MHz frequency subblock. Alternatively: (i) values 01 in the two bits, B26 and B27, of the SS Allocation subfield may indicate that the dRU is transmitted in a 20 MHz frequency segment used in the dRU transmission; (ii) values 10 in the two bits, B26 and B27, of the SS Allocation subfield may indicate that the dRU is transmitted in a 40 MHz frequency segment used in the dRU transmission; (iii) values 11 in the two bits, B26 and B27, of the SS Allocation subfield may indicate that the dRU is transmitted in an 80 MHz frequency segment used in the dRU transmission; and (iv) values 00 in the two bits, B26 and B27, of the SS Allocation subfield may be reserved or may indicate that the dRU is transmitted in a 160 MHz frequency subblock.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
generating, by a processor of an apparatus, a frame with indications of a resource unit (RU) type and a distributed-tone RU (dRU) distribution bandwidth; and
transmitting, by the processor, the frame to another apparatus,
wherein the RU type is indicated in a Common Information field or a Special User Information field of the frame, and
wherein the dRU distribution bandwidth is indicated in a Spatial Stream (SS) Allocation subfield of a User Information field of the frame,
wherein the dRU distribution bandwidth is indicated by three or four bits in the SS Allocation subfield of the User Information field,
wherein, responsive to the dRU distribution bandwidth being indicated by three bits:
two bits of the SS Allocation subfield indicate a size of a frequency segment used in a dRU transmission in transmitting the frame; and
another bit of the SS Allocation subfield indicates whether one or two spatial streams are used in transmitting the dRU, and
wherein, responsive to the dRU distribution bandwidth being indicated by four bits:
the two bits of the SS Allocation subfield indicate whether a dRU is transmitted in a 20 MHz, 40 MHz or 80 MHz frequency segment in transmitting the frame, and
two other bits of the SS Allocation subfield indicate whether one or two spatial streams are used in transmitting the dRU.

2. The method of claim 1, wherein the RU type is indicated by up to four consecutive bits in the Common Information field.

3. The method of claim 2, wherein the four consecutive bits comprise bits B56~B59 in a Reserved subfield of the Common Information field.

4. The method of claim 3, wherein:
responsive to a transmission bandwidth of 20 MHz, 40 MHz or 80 MHz, bit B56 indicates the RU type as regular RU (rRU) or dRU for a 20 MHz, 40 MHz or 80 MHz bandwidth while bits B57~B59 are reserved;
responsive to a transmission bandwidth of 160 MHz, each of bits B56 and B57 indicates the RU type for a respective 80 MHz frequency segment of two 80 MHz frequency segments while bits B58 and B59 are reserved; and
responsive to a transmission bandwidth of 320 MHz, each of bits B56~B59 indicates the RU type for a respective 80 MHz frequency segment of four 80 MHz frequency segments.

5. The method of claim 2, wherein the four consecutive bits comprise bits B59~B62 in a Reserved subfield of the Common Information field.

6. The method of claim 5, wherein:
responsive to a transmission bandwidth of 20 MHz, 40 MHz or 80 MHz, bit B59 indicates the RU type as regular RU (rRU) or distributed-tone RU (dRU) for a 20 MHz, 40 MHz or 80 MHz bandwidth while bits B60~B62 are reserved;

responsive to a transmission bandwidth of 160 MHz, each of bits B59 and B60 indicates the RU type for a respective 80 MHz frequency segment of two 80 MHz frequency segments while bits B61 and B62 are reserved; and responsive to a transmission bandwidth of 320 MHz, each of bits B59~B62 indicates the RU type for a respective 80 MHz frequency segment of four 80 MHz frequency segments.

7. The method of claim 2, wherein the four consecutive bits comprise bits B25~B28 in a Universal Signal (U-SIG) Disregard and Validate subfield of the Special User Information field.

8. The method of claim 7, wherein:

responsive to a transmission bandwidth of 20 MHz, 40 MHz or 80 MHz, bit B25 indicates the RU type as regular RU (rRU) or dRU for a 20 MHz, 40 MHz or 80 MHz bandwidth while bits B26~B28 are reserved;

responsive to a transmission bandwidth of 160 MHz, each of bits B25 and B26 indicates the RU type for a respective 80 MHz frequency segment of two 80 MHz frequency segments while bits B27 and B28 are reserved; and responsive to a transmission bandwidth of 320 MHz, each of bits B25~B28 indicates the RU type for a respective 80 MHz frequency segment of four 80 MHz frequency segments.

9. The method of claim 1, wherein the RU type is indicated by up to four non-consecutive bits in the Common Information field or a combination of the Common Information field and the Special User Information field of the frame.

10. The method of claim 9, wherein:

responsive to a transmission bandwidth of 20 MHz, 40 MHz or 80 MHz, bit B22 in a Reserved subfield of the Common Information field indicates the RU type as regular RU (rRU) or dRU for a 20 MHz, 40 MHz or 80 MHz bandwidth while bits B26, B53 and B63 are reserved;

responsive to a transmission bandwidth of 160 MHz, each of bits B22 and B26 indicates the RU type for a respective 80 MHz frequency segment of two 80 MHz frequency segments while bits B53 and B63 are reserved; and responsive to a transmission bandwidth of 320 MHz, each of bits B22, B26, B53 and B63 indicates the RU type for a respective 80 MHz frequency segment of four 80 MHz frequency segments.

11. The method of claim 9, wherein:

responsive to a transmission bandwidth of 20 MHz, 40 MHz or 80 MHz, bit B53 or B63 in a Reserved subfield of the Common Information field indicates the RU type as regular RU (rRU) or distributed-tone RU (dRU) for a 20 MHz, 40 MHz or 80 MHz bandwidth while bits B20, B21, B22 and B26 are reserved;

responsive to a transmission bandwidth of 160 MHz, each of bits B20 and B21 in a Gap Interval (GI) And High-Efficiency (HE)/Extremely-High-Efficiency (EHT) Long Training Field (EHT-LTF) Type/Triggered Transmission Opportunity (TXOP) Sharing Mode subfield of the Common Information field indicates the RU type for a respective 80 MHz frequency segment of two 80 MHz frequency segments while bits B22 and B26 are reserved and while bit B53 or B63 indicates that the RU type of at least one 80 MHz frequency segment is dRU; and responsive to a transmission bandwidth of 320 MHz, each of bits B20, B21, B22 and B26 indicates the RU type for a respective 80 MHz frequency segment of four 80 MHz frequency segments while bit B53 or B63 indicates that the RU type of at least one 80 MHz frequency segment is dRU.

12. The method of claim 9, wherein:

responsive to a transmission bandwidth of 20 MHz, 40 MHz or 80 MHz, bit B63 in a Reserved subfield of the Common Information field indicates the RU type as regular RU (rRU) or dRU for a 20 MHz, 40 MHz or 80 MHz bandwidth while bits B37~B39 in another Reserved subfield of the Special User Information field are reserved;

responsive to a transmission bandwidth of 160 MHz, each of bits B63 and B21 indicates the RU type for a respective 80 MHz frequency segment of two 80 MHz frequency segments while bits B38 and B39 are reserved; and responsive to a transmission bandwidth of 320 MHz, each of bits B63 and B37 B39 indicates the RU type for a respective 80 MHz frequency segment of four 80 MHz frequency segments.

13. The method of claim 1, wherein:

values 00 in the two bits, B26 and B27, of the SS Allocation subfield indicate that the dRU is transmitted in a 20 MHz frequency segment used in the dRU transmission;

values 01 in the two bits, B26 and B27, of the SS Allocation subfield indicate that the dRU is transmitted in a 40 MHz frequency segment used in the dRU transmission;

values 10 in the two bits, B26 and B27, of the SS Allocation subfield indicate that the dRU is transmitted in an 80 MHz frequency segment used in the dRU transmission; and values 11 in the two bits, B26 and B27, of the SS Allocation subfield are reserved or indicate that the dRU is transmitted in a 160 MHz frequency subblock.

14. The method of claim 1, wherein:

values 01 in the two bits, B26 and B27, of the SS Allocation subfield indicate that the dRU is transmitted in a 20 MHz frequency segment used in the dRU transmission;

values 10 in the two bits, B26 and B27, of the SS Allocation subfield indicate that the dRU is transmitted in a 40 MHz frequency segment used in the dRU transmission;

values 11 in the two bits, B26 and B27, of the SS Allocation subfield indicate that the dRU is transmitted in an 80 MHz frequency segment used in the dRU transmission; and values 00 in the two bits, B26 and B27, of the SS Allocation subfield are reserved.

15. The method of claim 1, wherein:

values 00 in the two bits, B26 and B27, of the SS Allocation subfield indicate that the dRU is transmitted in a 20 MHz frequency segment used in the dRU transmission;

values 01 in the two bits, B26 and B27, of the SS Allocation subfield indicate that the dRU is transmitted in a 40 MHz frequency segment used in the dRU transmission;

values 10 in the two bits, B26 and B27, of the SS Allocation subfield indicate that the dRU is transmitted in an 80 MHz frequency segment used in the dRU transmission; and values 11 in the two bits, B26 and B27, of the SS Allocation subfield are reserved or indicate that the dRU is transmitted in a 160 MHz frequency subblock.

16. The method of claim 1, wherein:

values 01 in the two bits, B26 and B27, of the SS Allocation subfield indicate that the dRU is transmitted in a 20 MHz frequency segment used in the dRU transmission;

values 10 in the two bits, B26 and B27, of the SS Allocation subfield indicate that the dRU is transmitted in a 40 MHz frequency segment used in the dRU transmission;

values 11 in the two bits, B26 and B27, of the SS Allocation subfield indicate that the dRU is transmitted in an 80 MHz frequency segment used in the dRU transmission; and values 00 in the two bits, B26 and B27, of the SS Allocation subfield are reserved or indicate that the dRU is transmitted in a 160 MHz frequency subblock.

17. An apparatus, comprising:

a transceiver configured to communicate wirelessly; and a processor coupled to the transceiver and configured to perform operations comprising:

generating, by a processor of an apparatus, a frame with indications of a resource unit (RU) type and a distributed-tone RU (dRU) distribution bandwidth; and transmitting, via the transceiver, the frame to another apparatus, wherein the RU type is indicated in a Common Information field or a Special User Information field of the frame, and wherein the dRU distribution bandwidth is indicated in a Spatial Stream (SS) Allocation subfield of a User Information field of the frame, wherein the RU type is indicated by up to four non-consecutive bits in the Common Information field or a combination of the Common Information field and the Special User Information field of the frame in a first arrangement or a second arrangement or a third arrangement, wherein, in the first arrangement:

responsive to a transmission bandwidth of 20 MHz, 40 MHz or 80 MHz, bit B22 in a Reserved subfield of the Common Information field indicates the RU type as regular RU (rRU) or dRU for a 20 MHz, 40 MHz or 80 MHz bandwidth while bits B26, B53 and B63 are reserved;

responsive to a transmission bandwidth of 160 MHz, each of bits B22 and B26 indicates the RU type for a respective 80 MHz frequency segment of two 80 MHz frequency segments while bits B53 and B63 are reserved; and responsive to a transmission bandwidth of 320 MHz, each of bits B22, B26, B53 and B63 indicates the RU type for a respective 80 MHz frequency segment of four 80 MHz frequency segments, wherein, in the second arrangement:

responsive to a transmission bandwidth of 20 MHz, 40 MHz or 80 MHz, bit B53 or B63 in a Reserved subfield of the Common Information field indicates the RU type as regular RU (rRU) or distributed-tone RU (dRU) for a 20 MHz, 40 MHz or 80 MHz bandwidth while bits B20, B21, B22 and B26 are reserved;

responsive to a transmission bandwidth of 160 MHz, each of bits B20 and B21 in a Gap Interval (GI) And High-Efficiency (HE)/Extremely-High-Efficiency (EHT) Long Training Field (EHT-LTF) Type/Triggered Transmission Opportunity (TXOP) Sharing Mode subfield of the Common Information field indicates the RU type for a respective 80 MHz frequency segment of two 80 MHz frequency segments while bits B22 and B26 are reserved and while bit B53 or B63 indicates that the RU type of at least one 80 MHz frequency segment is dRU; and responsive to a transmission bandwidth of 320 MHz, each of bits B20, B21, B22 and B26 indicates the RU type for a respective 80 MHz frequency segment of four 80 MHz frequency segments while bit B53 or B63 indicates that the RU type of at least one 80 MHz frequency segment is dRU, and wherein, in the third arrangement:

responsive to a transmission bandwidth of 20 MHz, 40 MHz or 80 MHz, bit B63 in a Reserved subfield of the Common Information field indicates the RU type as regular RU (rRU) or dRU for a 20 MHz, 40 MHz or 80 MHz bandwidth while bits B37~B39 in another Reserved subfield of the Special User Information field are reserved;

responsive to a transmission bandwidth of 160 MHz, each of bits B63 and B21 indicates the RU type for a respective 80 MHz frequency segment of two 80 MHz frequency segments while bits B38 and B39 are reserved; and responsive to a transmission bandwidth of 320 MHz, each of bits B63 and B37~B39 indicates the RU type for a respective 80 MHz frequency segment of four 80 MHz frequency segments.

18. A method, comprising:

generating, by a processor of an apparatus, a frame with indications of a resource unit (RU) type and a distributed-tone RU (dRU) distribution bandwidth; and transmitting, by the processor, the frame to another apparatus, wherein the RU type is indicated in a Common Information field or a Special User Information field of the frame, and wherein the dRU distribution bandwidth is indicated in a Spatial Stream (SS) Allocation subfield of a User Information field of the frame, wherein the RU type is indicated by up to four consecutive bits in the Common Information field in a first arrangement or a second arrangement or a third arrangement, wherein, in the first arrangement, the four consecutive bits comprise bits B56 B59 in a Reserved subfield of the Common Information field, and:

responsive to a transmission bandwidth of 20 MHz, 40 MHz or 80 MHz, bit B56 indicates the RU type as regular RU (rRU) or dRU for a 20 MHz, 40 MHz or 80 MHz bandwidth while bits B57~B59 are reserved;

responsive to a transmission bandwidth of 160 MHz, each of bits B56 and B57 indicates the RU type for a respective 80 MHz frequency segment of two 80 MHz frequency segments while bits B58 and B59 are reserved; and responsive to a transmission bandwidth of 320 MHz, each of bits B56~B59 indicates the RU type for a respective 80 MHz frequency segment of four 80 MHz frequency segments, wherein, in the second arrangement, the four consecutive bits comprise bits B59~B62 in a Reserved subfield of the Common Information field, and:

responsive to a transmission bandwidth of 20 MHz, 40 MHz or 80 MHz, bit B59 indicates the RU type as regular RU (rRU) or distributed-tone RU (dRU) for a 20 MHz, 40 MHz or 80 MHz bandwidth while bits B60~B62 are reserved;

responsive to a transmission bandwidth of 160 MHz, each of bits B59 and B60 indicates the RU type for a respective 80 MHz frequency segment of two 80 MHz frequency segments while bits B61 and B62 are reserved; and responsive to a transmission bandwidth of 320 MHz, each of bits B59~B62 indicates the RU type for a respective 80 MHz frequency segment of four 80 MHz frequency segments, and wherein, in the third arrangement, the four consecutive bits comprise bits B25 B28 in a Universal Signal (U-SIG) Disregard and Validate subfield of the Special User Information field, and:

responsive to a transmission bandwidth of 20 MHz, 40 MHz or 80 MHz, bit B25 indicates the RU type as regular RU (rRU) or dRU for a 20 MHz, 40 MHz or 80 MHz bandwidth while bits B26~B28 are reserved;

responsive to a transmission bandwidth of 160 MHz, each of bits B25 and B26 indicates the RU type for a respective 80 MHz frequency segment of two 80 MHz frequency segments while bits B27 and B28 are reserved; and responsive to a transmission bandwidth of 320 MHz, each of bits B25~B28 indicates the RU type for a respective 80 MHz frequency segment of four 80 MHz frequency segments.

\* \* \* \* \*